WILLIAM C. RUSSELL
Raymond L. Owens
INVENTORS

BY W. H. J. Kline
ATTORNEYS

— # United States Patent Office 3,702,730
Patented Nov. 14, 1972

3,702,730
ELECTRONICALLY CONTROLLED VARIABLE RATE FILM FEEDING MECHANISM FOR MOTION PICTURE PROJECTORS
William C. Russell, Bethlehem, Conn., assignor to Eastman Kodak Company, Rochester, N.Y.
Filed Apr. 12, 1971, Ser. No. 133,059
Int. Cl. G03b 1/22
U.S. Cl. 352—191                              4 Claims

ABSTRACT OF THE DISCLOSURE

In a film feeding mechanism for a motion picture projector of the type having a film claw mounted for up-and-down movement in a film advancing direction and in-and-out movement in a film engaging and disengaging direction relative to a film to advance the film through the projector, the in-and-out movement being effected intermittently by a solenoid. The control circuit for the solenoid includes a variable oscillator producing a signal the frequency setting of which determines the frequency of the in-and-out movement of the claw, and hence the rate of film advance, during continuous constant-speed reciprocation of the claw in the up-and-down direction. The oscillator may control the circuit through an electronic switch controlled by the oscillator, and timing of the solenoid action relative to the claw position is effected by a timing switch or switches, preferably cam operated.

BACKGROUND OF THE INVENTION

Field of the invention

This invention relates generally to motion picture projectors, and more specifically to improved variable rate film feeding mechanisms for such projectors. In particular, the invention relates to an improved electrical or electronic arrangement for controlling and varying the in-and-out movement of a film pull-down claw during up-and-down reciprocation thereof.

DESCRIPTION OF THE PRIOR ART

In motion picture projectors of the type utilizing a film claw to advance the film, the claw is customarily reciprocated up-and-down in a film advancing direction at a constant rate, and is moved into and out of engagement with the film at appropriate times so as to effect film advance at a frame-per-second rate equal to, or an aliquot of, the reciprocation frequency, depending upon the in-and-out frequency of the claw. To achieve variable rate projection, "skip-frame" devices have been incorporated in the feeding mechanisms, whereby the claw pulls down film only during selected reciprocation cycles, and does not engage the film during the "skip-frame" cycles, thus effecting film feeding at variable rates dependent upon the frequency of pull-down cycle relative to "skip-frame" cycles. Such devices often take the form of multiple in-and-out cam surfaces cooperating with a shiftable follower which cooperates with the claw, each cam surface being formed to effect a particular skip-frame pattern, and the follower being capable of cooperating with any selected one of the cam surfaces. Exemplary of such feeding mechanisms are those shown in U.S. Pat. No. 3,212,840 (Roman et al.), U.S. Pat. No. 3,261,654 (Faber et al.), and U.S. Pat. No. 3,533,688 (Painton).

In other variable rate feeding mechanisms for projectors, the in-and-out movement of the claw is effected electromagnetically rather than by cams, and provisions are made to pass selectively variable control signals to the electromagnet so as to cause it to move the claw into and out of engagement with the film at intervals appropriate to accomplish the desired feed rate. Exemplary of such electromagnetic types is that shown in U.S. Pat. No. Re. 26,283 (Gerlach), wherein the different control signals are achieved by plural selectable switches which are opened and closed at different intervals by appropriately formed plural cam surfaces, or by a switch which is shiftable from one cam surface to another, or by a shiftable slide contact cooperating with a multiple signal commutator. Other known arrangements incorporate some features of each of the foregoing. For instance, in the film feeding device disclosed in Australian Pat. No. 215,804 (Kropp et al., complete specification accepted June 30, 1958), the in-and-out movement of the claw is effected by a constant speed rotary cam, and variable feed rates are achieved by shifting the cam into and out of operative relationship with the claw, the shifting being accomplished through a solenoid which is operated in a selectively variable manner by a variable electrical control circuit.

U.S. Pat. No. 2,772,325 (Gaite) discloses a mechanism for producing step-by-step linear drive of a strip form material, stated to be useful in the telecommunication art, in tape readers as used in automatic transmission heads in teleprinters. In the mechanism of the Gaite patent, both the up-and-down movement and the in-and-out movement of the claw are effected by respective solenoids, the solenoids being operated by an electrical pulse source, which actuates the solenoids to drive the strip material at a set speed. In the Gaite arrangement, any change in the frequency of the pulse source would correspondingly change the frequency of both movements of the claw, thus rendering the device not readily adaptable for use in motion picture projectors where it is usually desired to rotate the shutter and reciprocate the claw in the up-and-down direction at constant rates.

SUMMARY OF THE INVENTION

It is an object of this invention to provide a variable-rate film feeding mechanism which is highly flexible as regards its scope of variable operative capabilities, and which avoids the mechanically and/or electrically complex structures which have been often characteristic of the prior art arrangements. In general, this object is achieved through the provision of an electromagnetic in-and-out actuator for the film claw, and an improved variable control circuit for the electromagnetic actuator.

In accordance with the preferred embodiment of the invention, the electromagnetic actuator, which may be a conventional solenoid, is energized and de-energized by an electrical circuit at frequencies controlled by a variable frequency oscillator, whereby the rate of film feeding is controlled by the variable pulse frequencies of the oscillator. Preferably the pulses control the state of an electronic switch in the circuit, thus energizing the circuit only for those selected reciprocatory cycles during which a frame of the film is to be advanced. Timing switches are provided to control the actual times of energization and de-energization of the electromagnetic actuator during each such selected reciprocatory cycle, so as to ensure that the in-and-out movements of the claw are properly phased with the up-and-down movements thereof, the up-and-down movements being effected continuously at a constant rate, preferably by a constant speed rotary cam of the type used in the prior art devices.

The invention, and its objects and advantages, will become more apparent in the detailed description of the preferred embodiment presented below.

BRIEF DESCRIPTION OF THE DRAWING

In the detailed description of the preferred embodiment presented below, reference is made to the accompanying drawing, in which.

DESCRIPTION OF THE PREFERRED EMBODIMENT

Because motion picture projectors are well known, the present description will be directed in particular to elements forming part of, or cooperating more directly with, the present invention, it being understood that projector elements not specifically shown or described herein may take various forms well known to those skilled in the art.

Figure 1:
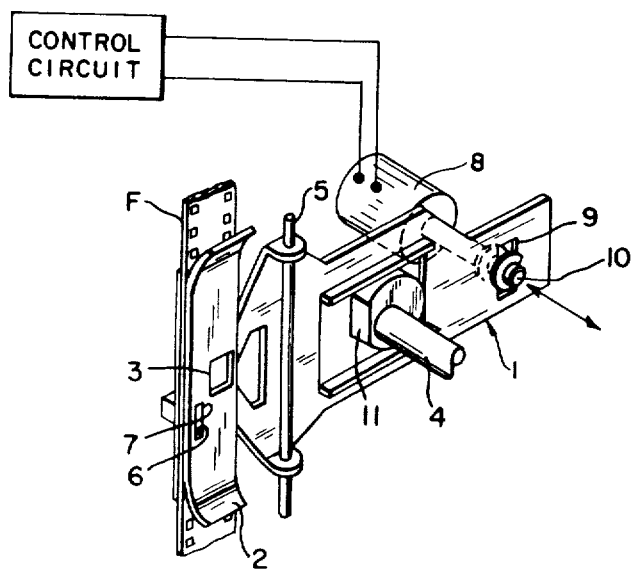
FIG. 1 is a perspective view, partially fragmentary, of a film feeding mechanism according to the invention.

Referring to the drawings, FIG. 1 illustrates a projector mechanism that, with the exception of the in-and-out drive for the claw, may be similar to that disclosed in Roman Pat. No. 3,212,840 or Faber et al. Pat. No. 3,261,654 and it is to be understood that elements not shown in the drawing may take the form disclosed in such patents. The mechanism comprises a conventional claw arm 1 mounted for up-and-down movement on a guide rod 5, and pivotal movement about the rod 5, such that claws 6 may engage and disengage the apertures of film F and selectively pull down the film through ta film gate 2, having a projection aperture 3 and slot 7 through which the claws 6 extend when engaging the perforations in the film. The up-and-down reciproation of the claw arm 1 may be effected in a conventional manner by a cam 11 rotated at a constant speed by drive shaft 4, which may also carry a shutter and a reversing mechanism of the type shown in Roman et al. Pat. No. 3,212,840.

In accordance with the inventor, the pivotal movement of claw arm 1 about rod 5, and hence the in-and-out movement of the claws or teeth 6, is effected intermittently by a solenoid 8 having a spring-loaded plunger 10 passing through an elongate slot 9 in claw arm 1. Conventional retainer clips or the like are provided on the plunger 10 at opposite sides of the claw arm 1 such that the claw arm 1 must move with the plunger 10 as the solenoid is energized and de-energized, but the claw arm 1 is freely movable in the up-and-down direction relative to the plunger 10. The solenoid is, of course, fixedly mounted in the projector housing. Energization and de-energization of the solenoid is effected by an electrical control circuit diagrammatically illustrated in FIG. 1, and shown in more detail in FIG. 2.

From the FIG. 1, it will be clear that, with cam 11 rotated at a constant speed by drive shaft 4, the claw arm will be reciprocated up-and-down at a constant rate, and as long as the solenoid is in a de-energized state, the claws or teeth 6 will not engage the film. Energization of the solenoid will cause the claws 6 to engage the film, and advance the film by one frame during the pull-down movement of the claws. If the solenoid is energized during the pull-down phase of each reciprocatory cycle of the claw arm and its claws, then the film will be advanced at a frame-per-second rate equal to the reciprocation cycle rate of the claw arm. If the solenoid is energized during the pull-down phase of every second reciprocatory cycle of the claw arm, then the fim will be advanced at a correspondingly slower rate.

Figure 2:
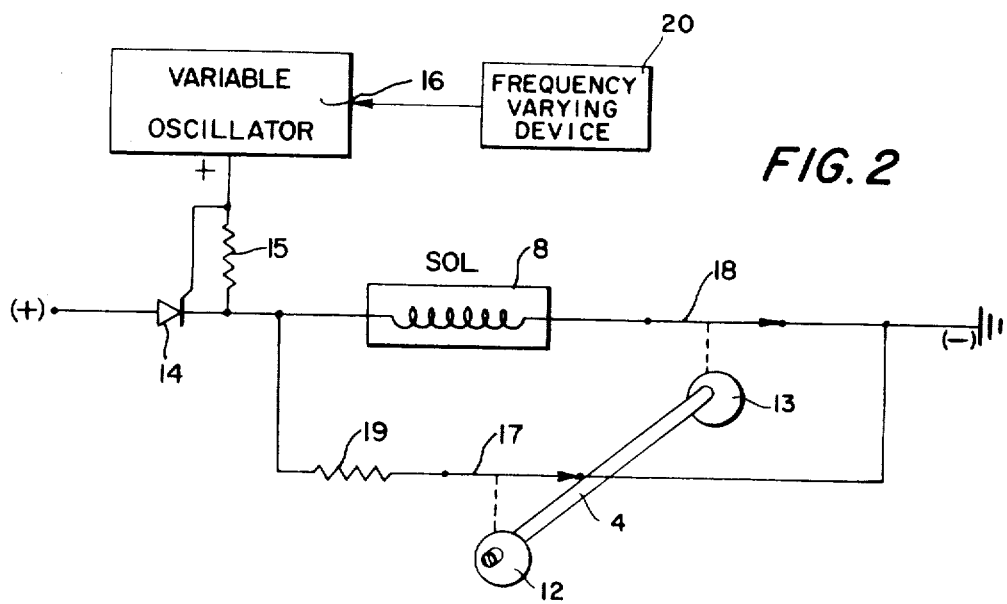
FIG. 2 is a diagrammatic illustration of an exemplary control circuit.

An exemplary control circuit for the solenoid is illustrated in FIG. 2, were solenoid 8 is shown as being in series circuit connection with an electronic switch, preferably a silicon controlled rectifier 14, and a normally closed switch 18 controlled by a rotary cam 13. Shunted around solenoid 8 are a resistor 19 and a normally closed switch 17 controlled by a cam 12. The resistance value of resistor 19 preferably is lower than that of solenoid 8. As shown schematically in FIG. 2, cams 12 and 13 conveniently are mounted on drive shaft 4 of the projector. A variable frequency oscillator 16 which produces a pulse type signal at a selected frequency (variable, for instance, between one-sixtieth c.p.s. and one c.p.s.) is connected to the gate of silicon controlled rectifier 14 such that a pulse from oscillator 16 will turn on SCR 14. A resistor 15 is connected between the gate and the collector of the SCR so that, when a positive voltage pulse is applied to the gate of the SCR and the SCR begins to conduct and will continue to conduct until a conduction path through the SCR is interrupted by opening the switches 17 and 18. Cams 12 and 13 are appropriately configured and oriented on shaft 4 to ensure proper timing between the energization and de-energization of solenoid 8 and the reciprocatory cycles of the claw arm, regardless of the timing of the positive pulses from oscillator 16.

The operation of the device will be clear from the foregoing description and illustrations. Thus, with the claw arm reciprocating up-and-down at a fixed rate, a series of electrical pulses is generated by the highly stable oscillator 16, the frequency of which is adjustable by a device 20 which preferably will include an R-C tank circuit as will be well understood to those skilled in the art. The frequency of the signal may be adjusted by varying the resistance of a potentiometer and the capacitance of a capacitor not shown. Moreover, the beginning of each pulse may be time phased to the operation of a selected portion of the pull-down cycle by means of a switch (not shown) coupled to the shaft 4 and providing timing information to the oscillator 16. At the start of a pull-down cycle a pulse from the oscillator turns on the SCR to complete a circuit inasmuch as both switches 17 and 18 will be closed. The SCR remains on for the time being, and as long as the resistor is in the circuit, the current flowing through the solenoid in insufficient to energize the solenoid to the level wherein the pull-down claw will be moved into engagement with the film. Cam 12 is configured such that when the pull-down claw reaches a predetermined position appropriate for engagement of the claw with the film, cam 12 open-circuits the shunt resistor 19, resulting in increased current flow to the solenoid sufficient to energize the solenoid to a level to cause the pull-down claw to engage a film perforation and advance the film by one frame. Shortly thereafter, the circuit is momentarily interrupted by the switch 18 opening. Since at this time both switches 17 and 18 are open the SCR will turn off and thereby release the solenoid and pull-down claw, resetting the mechanism to respond to the next pulse from oscillator 16. Just prior to the next pull-down cycle, the switches 17 and 18 will close; depending on the frequency setting of oscillator 16, the signal pulses may be such as to cause the claw to advance one frame of film during the pull-down phase of each reciprocatory cycle, or every second reciprocatory cycle, every third reciprocatory cycle, etc.

Although cam operated switch 18 has been described and illustrated as a cam controlled switch, it could also take the form of a switch controlled by solenoid 8, that is, one which would be opened by the energized movement of the plunger of solenoid 8, thus turning off the SCR and de-energizing the solenoid automatically upon full energization of the solenoid. However, the cam controlled switch embodiment is believed to be more precise and more reliable, and hence is the preferred embodiment.

Switches 17 and 18 may be timed in any appropriate manner to ensure that the claws engage and disengage the film perforations only at proper times; that is, engagement during the dwell time of the claw preceding the pull-down phase of the reciprocatory cycle, and disengagement during the dwell time following the pull-down phase of the reciprocatory cycle. The actual setting of these switches will depend upon the response times and inertia characteristics of the elements used in a particular model or embodiment. In one exemplary setting arrangement, the cams might be configured and oriented such that switch 17 would be open only during the top dwell period of the claws preceding a pull-down stroke. This would thus permit energization of the solenoid only during this top dwell time. Switch 18 then might be opened only momentarily at the end of the open period of switch 17, the simultaneously open state of both switches ensuring that the SCR is turned off and the solenoid is deenergized, the inertia time response of the energized solenoid being such as to maintain the claws in engagement with the film through the pull-down stroke and into the bottom dwell time, but such as to disengage the claws before the beginning of the following upstroke. In another timing arrangement, microswitch 17 might be open during the top dwell time preceding the pull-down stroke, and then again momentarily during the bottom dwell period following the pull-down stroke but before the beginning of the return upstroke, with microswitch 18 being also open momentarily during the bottom dwell period when switch 17 is open. In this arrangement, the solenoid would be energized, or at least energizable, only during the top dwell period, and would remain energized during the pull-down stroke, and would be deenergized during the bottom dwell period. The solenoid would remain energized during the pull-down stroke even with switch 17 closed, since the current through the solenoid with switch 17 closed is sufficient to hold the solenoid in an energized state, although insufficient to initially energize it. With either of these timing arrangements, it should be noted that even if the SCR were turned on by a pulse during the middle of a pull-down stroke, the solenoid could not be initially energized during the pull-down stroke because of the closed condition of switch 17, regardless of the condition of switch 18. With either of these exemplary timing arrangements, the frequency of the oscillator pulses would determine the pattern of film pull-down strokes and skip-frame strokes, and for each film pull-down stroke (the down stroke of a reciprocatory cycle during which the SCR is turned on) the switches determine the actual time of energization and de-energization of the solenoid, in addition to turning off the SCR and setting the system to respond to the next pulse from the oscillator.

The particular circuit configuration is, of course, not essential to the invention. Thus, resistor 19 could be shunted only around solenoid 8 rather than round solenoid 8 and switch 18. Other workable circuit configurations will be apparent to those skilled in the art. An important characteristic of the illustrated circuit is that it permits the SCR to be turned on by a pulse received at any time during a major portion of the reciprocatory cycle of the claws, thus minimizing the need for precise timing between the oscillator pulses and the position of the claws.

The invention has been described in detail with particular reference to a preferred embodiment thereof, but it will be understood that variations and modifications can be effected within the spirit and scope of the invention as described hereinabove and as defined in the appended claims.

I claim:

1. In an intermittent film feeding mechanism for a motion picture projector having a film claw mounted for up-and-down reciprocation in a film advancing direction and in-and-out movement in a film engaging and disengaging direction relative to a film to advance the film through the projector, and means for cyclically reciprocating said claw in said up-and-down direction, the combination comprising:

electromagnetic means for effecting in-and-out movement of said claw to feed the film through the projector at rates determined by the frequencies at which said electromagnetic means is energized and de-energized, and selectively variable electrical circuit means, including a variable frequency oscillator for producing a signal at a selectable frequency, frequency varying means coupled to said oscillator for selecting said frequency produced by said oscillator and means responsive to said signal for effecting energization and de-energization of said electromagnetic means to cause the claw to feed film during selected reciprocatory cycles of the up-and-down claw at a rate which is a function of the selected frequency of said signal, said electromagnetic means comprising a solenoid, and wherein said selectively variable electrical circuit means includes an electronic switch actuatable between open and closed conditions as a function of the frequency of said signal, means for receiving a source of voltage and circuit means coupled to the voltage source when said switch is in said closed condition, said circuit means including a shunt circuit around said solenoid having a first switch for preventing energization of said solenoid except during a predetermined range of positions of the claw, and a second switch in series with said solenoid for effecting deenergization of said solenoid and opening of said electronic switch.

2. Apparatus as claimed in claim 1 wherein said first switch is a normally closed switch controlling a shunt path around said solenoid, and said second switch is a normally closed switch in series circuit with said solenoid, whereby with said electronic switch closed, said first switch prevents energization of said solenoid until opened, and said second switch thereafter opens to open said electronic switch and de-energize said solenoid.

3. Apparatus as claimed in claim 2 wherein said first switch is cam-operated in timed relationship with the reciprocation of the claw.

4. Apparatus as claimed in claim 3 wherein said second switch is cam-operated in timed relationship with the reciprocation of the claw.

References Cited

UNITED STATES PATENTS

| 2,834,832 | 5/1958 | Somers | 352—191 X |
| 3,520,596 | 7/1970 | O'Donnell | 352—92 |
| 3,157,882 | 11/1964 | Barnett | 352—191 X |
| 3,265,457 | 8/1966 | Dale | 352—191 X |

SAMUEL S. MATTHEWS, Primary Examiner

M. H. HAYES, Assistant Examiner

U.S. Cl. X.R.

352—180, 194